(12) United States Patent
Thompson et al.

(10) Patent No.: US 11,999,322 B2
(45) Date of Patent: Jun. 4, 2024

(54) VEHICLE TIRE HEATER AND CLEANER SYSTEM

(71) Applicants: Eric R Thompson, Lake Orion, MI (US); Colin M Cole, Oxford, MI (US); Aleksander Tonkovich, Keego Harbor, MI (US)

(72) Inventors: Eric R Thompson, Lake Orion, MI (US); Colin M Cole, Oxford, MI (US); Aleksander Tonkovich, Keego Harbor, MI (US)

(73) Assignee: FCA US LLC, Auburn Hills, MI (US)

( * ) Notice: Subject to any disclaimer, the term of this patent is extended or adjusted under 35 U.S.C. 154(b) by 499 days.

(21) Appl. No.: 17/176,625

(22) Filed: Feb. 16, 2021

(65) Prior Publication Data

US 2021/0253069 A1 Aug. 19, 2021

Related U.S. Application Data

(60) Provisional application No. 62/978,056, filed on Feb. 18, 2020.

(51) Int. Cl.
*B60S 1/68* (2006.01)
*B60T 7/02* (2006.01)
*B60T 8/26* (2006.01)
*G07C 5/08* (2006.01)

(52) U.S. Cl.
CPC ...... *B60S 1/68* (2013.01); *B60T 7/02* (2013.01); *B60T 8/26* (2013.01); *G07C 5/0808* (2013.01)

(58) Field of Classification Search
CPC ...... B60S 1/68; B60T 7/02; B60T 8/26; G07C 5/0808
See application file for complete search history.

(56) References Cited

U.S. PATENT DOCUMENTS

| | | | |
|---|---|---|---|
| 6,406,103 B1 | 6/2002 | Elliott et al. | |
| 8,175,785 B2 | 5/2012 | Turski et al. | |
| 9,731,721 B1 | 8/2017 | Wilder et al. | |
| 9,855,813 B2 | 1/2018 | Mohamed | |
| 10,471,941 B2 | 11/2019 | Collins et al. | |
| 10,875,367 B2 | 12/2020 | Sanborn et al. | |
| 2005/0026746 A1* | 2/2005 | Stine | F16H 61/702 477/34 |
| 2010/0307531 A1* | 12/2010 | Aharonov | B60S 3/041 134/123 |
| 2011/0175438 A1 | 7/2011 | Mlynarczyk et al. | |
| 2015/0300312 A1* | 10/2015 | Ferguson | F02P 5/15 123/406.12 |
| 2017/0190228 A1* | 7/2017 | Handzel, Jr. | B60W 30/02 |
| 2019/0255895 A1* | 8/2019 | Sanborn | B60T 13/686 |

\* cited by examiner

*Primary Examiner* — Truc M Do
(74) *Attorney, Agent, or Firm* — Jeremy J. Klobucar

(57) ABSTRACT

A front tire heating and cleaning system for a vehicle includes a brake system configured to selectively apply hydraulic braking pressure against front wheels and rear wheels of the vehicle, and a controller in signal communication with the brake system. The controller is configured to, upon receipt of a request, initiate a controlled front tire heating mode where the brake system is controlled to selectively apply hydraulic braking pressure against the rear wheels and not the front wheels, and rotate the front wheels to increase tire temperature for improved front wheel traction during off-road maneuvers.

11 Claims, 5 Drawing Sheets

VEHICLE TIRE HEATER AND CLEANER SYSTEM

CROSS REFERENCE TO RELATED APPLICATION

This application claims the benefit of U.S. Provisional Application No. 62/978,056, filed Feb. 18, 2020, the contents of which are incorporated herein by reference thereto.

FIELD

The present application relates generally to vehicles and, more particularly, systems and methods for heating and cleaning tires of a vehicle for improved traction.

BACKGROUND

Some vehicles are intended to be driven in an off-road capacity. During some off-roading maneuvers, for example when climbing a steep rock ledge, it may be difficult for the vehicle to gain traction on one or more obstacles. Accordingly, it may be desirable to provide more traction to one or more vehicle tires to facilitate pulling the rest of the vehicle over the obstacles.

SUMMARY

In accordance with one example aspect of the invention, a front tire heating and cleaning system for a vehicle is provided. The heating and cleaning t system includes a brake system configured to selectively apply hydraulic braking pressure against front wheels and rear wheels of the vehicle, and a controller in signal communication with the brake system. The controller is configured to, upon receipt of a request, initiate a controlled front tire heating mode where the brake system is controlled to selectively apply hydraulic braking pressure against the rear wheels and not the front wheels, and rotate the front wheels to increase tire temperature for improved front wheel traction during off-road maneuvers.

In addition the foregoing, the described heating and cleaning system may include one or more of the following features: wherein the controller is programmed to temporarily disable propulsive torque to the rear wheels when operating in the front tire burnout mode; wherein upon receipt of a second request, the controller is programmed to initiate a front tire cleaning mode where the brake system is controlled to selectively apply hydraulic braking pressure against the rear wheels and not the front wheels such that the front wheels are free to rotate to eject debris therefrom; wherein the controller rotates the front wheels in a first direction to perform the front tire burnout, and in an opposite second direction to perform the front tire cleaning; an activation switch disposed within the vehicle, wherein the activation switch is selected to enable the performance of the front tire burnout mode; and wherein the activation switch is disposed on an instrument panel of the vehicle.

In addition the foregoing, the described heating and cleaning system may include one or more of the following features: a user interface in signal communication with the controller, the controller configured to receive the request from the user interface indicating the driver has selected the front tire burnout mode; wherein the controller is configured to determine whether a vehicle precondition is satisfied before enabling the vehicle to enter the front tire burnout mode, the vehicle precondition including at least one of (i) a transfer case being engaged to transfer rotational power to the front wheels, and (ii) a front differential being locked; and a user interface in signal communication with the controller, wherein during the front tire burnout mode the user interface is configured to display a message indicating the front tire burnout mode is active.

In accordance with one example aspect of the invention, a method of performing a controlled front tire heating and/or cleaning mode on a vehicle having front wheels and rear wheels is provided. The method includes receiving, at a controller, a request for a front tire burnout mode, and based on the received request, initiating the front tire burnout mode with the controller by applying hydraulic braking pressure against the rear wheels and not the front wheels of the vehicle, and rotating the front wheels to increase tire temperature for improved front wheel traction during off-road maneuvers.

In addition the foregoing, the described method may include one or more of the following features: temporarily disabling propulsive torque to the rear wheels when operating in the front tire burnout mode; receiving, at the controller, a second request for a front tire cleaning mode; initiate a front tire cleaning mode where the brake system is controlled to selectively apply hydraulic braking pressure against the rear wheels and not the front wheels such that the front wheels are free to rotate to eject debris therefrom; preventing initiation of the front tire burnout mode until an activation switch disposed within the vehicle is selected; and wherein the activation switch is disposed on an instrument panel of the vehicle.

In addition the foregoing, the described method may include one or more of the following features: wherein the request is received from a user interface indicating the driver has selected the front tire burnout mode; the determining whether a vehicle precondition is satisfied before enabling the vehicle to enter the front tire burnout mode, the vehicle precondition including at least one of (i) a transfer case being engaged to transfer rotational power to the front wheels, and (ii) a front differential being locked; and displaying, on a user interface, a message indicating when the front tire burnout mode is active.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

According to the principles of the present application, systems and methods are described for performing a front tire heating mode or burnout mode to heat the vehicle tires and increase traction. Such an operation may also be performed to remove dirt or debris from the tires to further increase traction, and this cleaning mode may hereinafter be discussed together with and as the front tire burnout mode or separately to highlight differences between the heating and cleaning modes of operation. For example and as will be discussed herein in greater detail, the cleaning mode may be performed with one of the front tires not in contact with the ground and/or by rotating the front tires in an opposite direction as in the heating mode.

In the example embodiments, the systems include a button or switch available to the driver to temporarily disable propulsive torque to the rear wheels while simultaneously locking up both rear brakes. This allows only the front tires to be rotated/driven while the rear tires hold the vehicle in place. Accordingly, the front tires perform a front tire burn out, which heats up the front tires to improve traction, for example, when crawling over a steep object. The system can also be used to clean mud/debris off the front tires to improve traction. A message can be displayed to the driver when the system is active. To improve ejection of debris in the cleaning mode, a driver can position the vehicle so that one of the front tires may not be in contact with the ground thereby improving the ability to eject debris from that tire in the cleaning mode.

Figure 1:
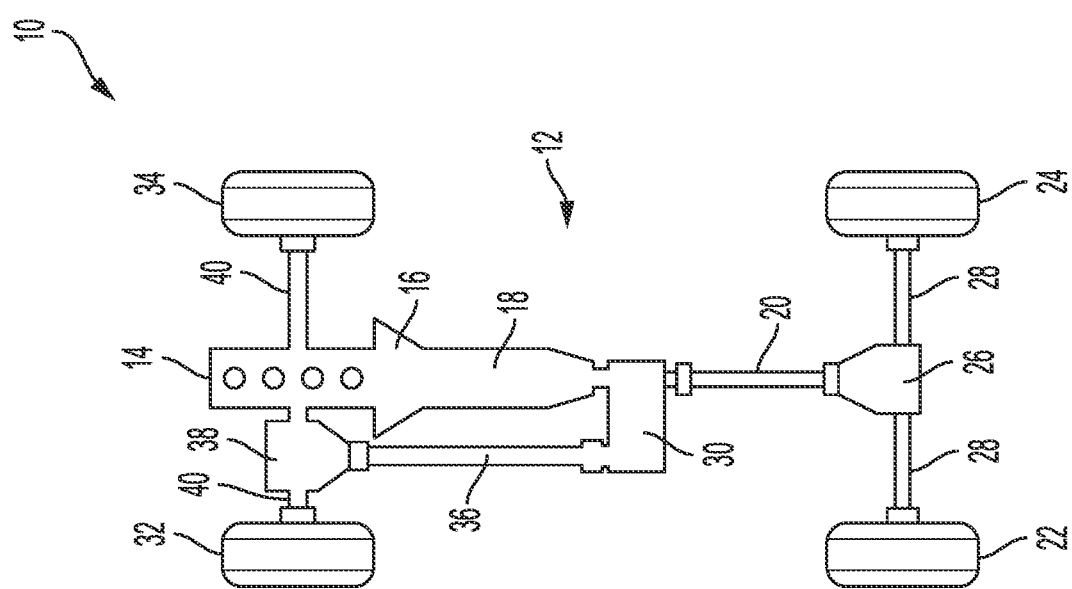
FIG. 1 is a schematic illustration of an example vehicle drivetrain in accordance with the principles of the present application.

With initial reference to FIG. 1, an example vehicle is illustrated and generally identified at reference numeral 10. In the example embodiment, vehicle 10 includes a propulsion system 12 that generally includes an internal combustion engine 14, a clutch or torque converter 16, and a transmission 18. Reciprocating motion of the engine 14 is converted into rotational motion via torque converter 16 and transmitted to a drive shaft 20 via the transmission 18. Rotational motion of the drive shaft 20 is transferred to rear wheels 22, 24 via a rear differential 26 and rear drive axles 28. A transfer case 30 is configured to transfer rotational motion to front wheels 32, 34 via a front drive shaft 36, front differential 38, and front drive axles 40. In some examples, the transfer case 30 includes a shifting mechanism (e.g., shift fork) configured to selectively disengage the rear axles 28 and/or the front axles 40 from the propulsion system 12.

Figure 2:
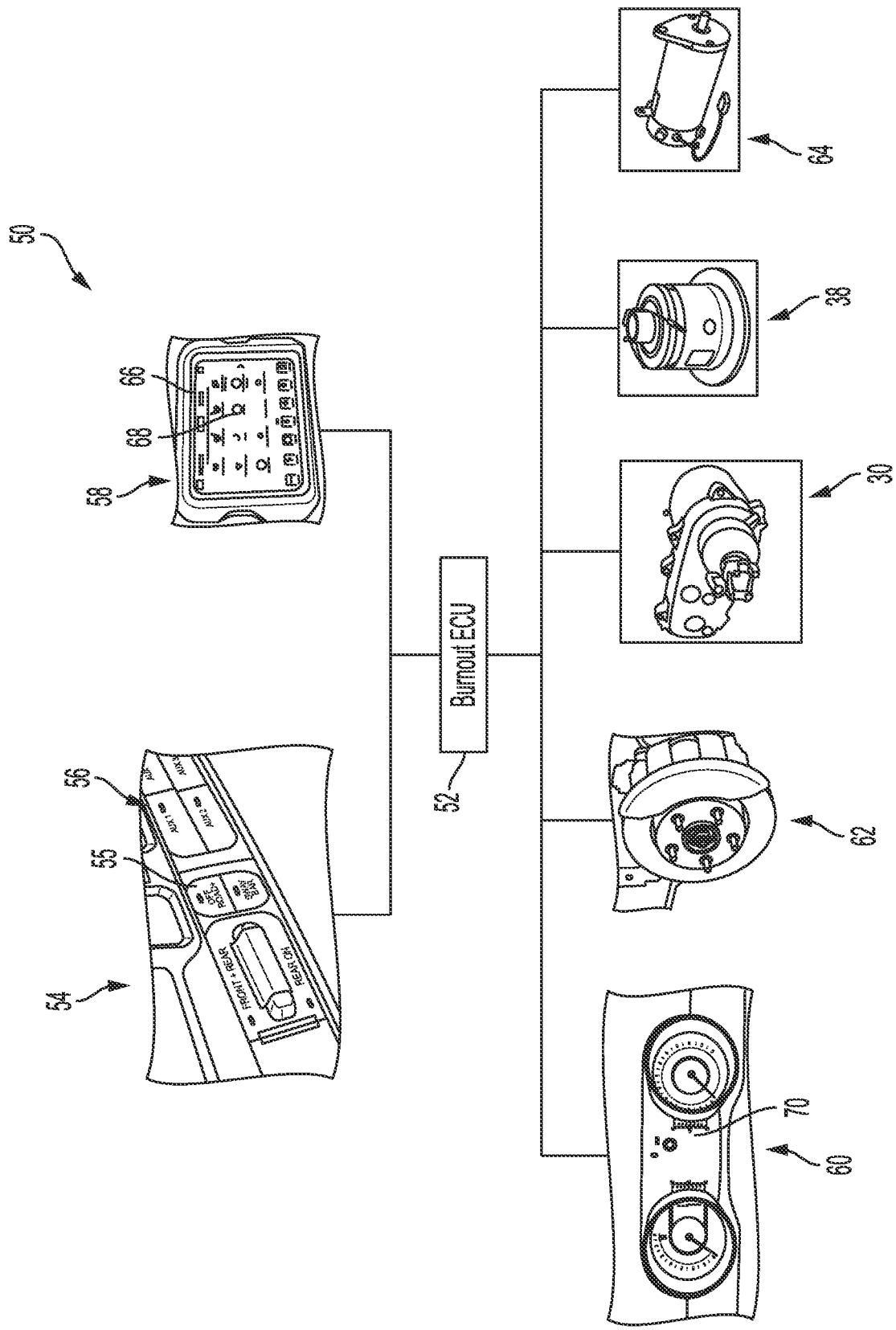
FIG. 2 is a schematic diagram of an example front tire burnout system of the vehicle shown in FIG. 1, in accordance with the principles of the present application.

With additional reference to FIG. 2, the vehicle 10 includes front tire burnout system 50 configured to selectively transition the vehicle from a normal mode to a burnout/cleaning mode where vehicle rear wheels 22, 24 are locked and a braking pressure is selectively released on vehicle front wheels 32, 34. This enables the driver to apply the throttle to rotate the front wheels 32, 34 and perform a controlled burnout. The vehicle then returns to the normal operating mode behavior after the burnout/cleaning feature has been deactivated.

In the example embodiment, the front tire burnout system 50 includes a controller 52 configured to enable vehicle 10 to perform a front tire burnout and/or cleaning. In one example, the front tire burnout system 50 rotates the front wheels 32, 34 in a first direction (e.g., forward rotation) to perform the front tire burnout, and a second direction (e.g., reverse rotation) to perform the front tire cleaning. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

In the illustrated example, controller 52 is in signal communication with an instrument panel 54 having an "off-road" mode switch 55, a front tire heater or burnout mode activation switch 56, a touchscreen or display 58, an instrument panel cluster 60, a braking system 62, transfer case 30, front differential 38, and optionally an electric motor 64. The controller 52 is in signal communication with the front tire burnout system 50, and enables the driver to activate and deactivate the burnout/cleaning mode. Moreover, in one exemplary implementation, the various components connected to the controller 52 assist the driver in performing the controlled burnout/cleaning when the burnout/cleaning mode is activated, for example, through a sequence of audio and/or visual cues.

In the example embodiment, the off-road mode switch 55 is configured to switch the vehicle 10 between an on-road mode and an off-road mode, and the front tire burnout mode activation switch 56 is configured to switch vehicle 10 between a driving mode and a front tire burnout mode. In some embodiments, the off-road mode switch 55 and/or the front tire burnout mode switch 56 must be activated or selected before front tire burnout system 50 can be activated. It will be appreciated, however, that switches 55, 56 may be located in any suitable location in the vehicle such as, for example, instrument panel 54 or a vehicle steering wheel (not shown).

In the example embodiment, the display 58 includes a user interface 66 configured to provide audio/visual information related to the front tire burnout/cleaning system and mode to the driver. For example, the user interface 66 may be a touch-screen configured to display one or more soft keys 68 programmed to perform a specific function when selected. In one example implementation, soft key 68 may be selected by the driver to request an automatic front tire burnout/cleaning mode and/or a brake lock. Once selected, the user interface 66 can display various information related to the front tire burnout/cleaning mode. For example, user interface 66 may display whether one or more vehicle conditions are satisfied that will enable activation of the front tire burnout/cleaning mode. If the conditions are not satisfied, the user interface 66 may display information regarding the unsatisfied condition, and may subsequently deactivate the front tire burnout/cleaning mode or otherwise prevent initiation of the controlled burnout.

In other configurations, user interface 66 may provide audio communications to the driver in place of or in addition to visual displays, as well as receive audio commands from the driver. However, the burnout system 50 is not limited solely to the function described herein and may be utilized in various other ways to control the front tire burnout/cleaning and associated controlled burnout.

In the example embodiment, the instrument panel cluster 60 includes a display 70 configured to provide information to the driver such as, for example, vehicle speed or engine rotational speed. Additionally, the display 70 is configured to display a status and/or diagnostic message from the front tire burnout system 50, as well as provide information or direction to the driver during the front tire burnout/cleaning mode. In some implementations, the display 70 provides a series of directions to the driver to enable the vehicle 10 to perform the controlled burnout.

Figure 3:
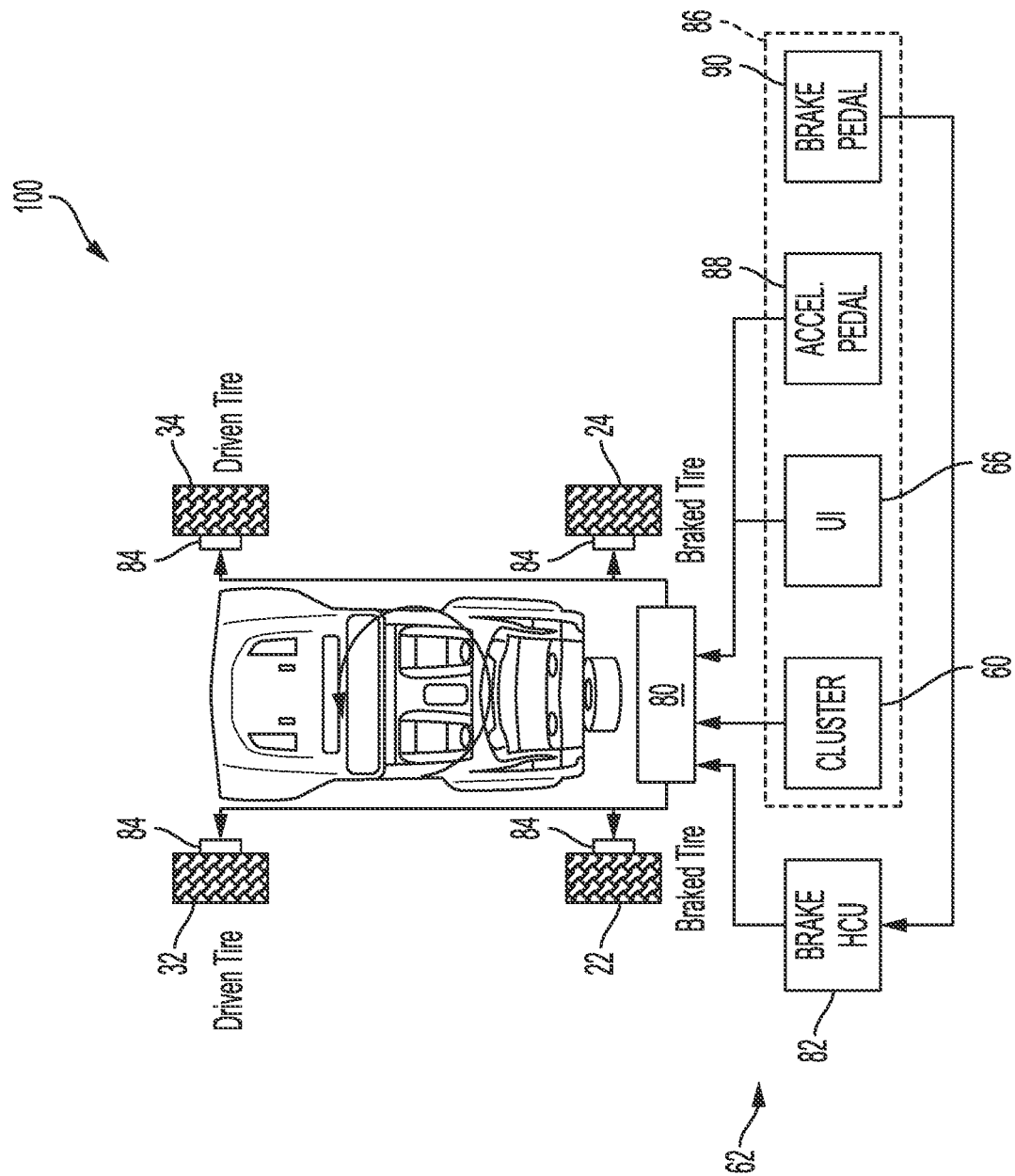
FIG. 3 is a schematic illustration of an example vehicle with the front tire burnout system, in accordance with the principles of the present disclosure.

FIG. 3 illustrates a vehicle control system 80 according to one exemplary implementation. The vehicle control system 80 may be in signal communication with the front tire burnout system 50 and may be utilized as the system for operating vehicle 10 in the front tire burnout/cleaning mode. As shown, the vehicle control system 80 includes the brake system 62, which generally includes a brake control unit 82 coupled to a plurality of braking devices 84 each located at one of the vehicle wheels. The brake control unit 82 is configured to selectively direct hydraulic fluid to the braking devices 84 to apply braking pressure against the wheels. As such, during the front tire burnout/cleaning mode, the brake control unit 82 can selectively apply hydraulic braking pressure against rear wheels 22, 24 while releasing hydraulic braking pressure against the front wheels 32, 34. The braking devices 84 may be any suitable type of brake such as, for example, disc brakes, drum brakes, electronic brakes, or the like.

Driver input devices 86 are in signal communication with the brake control unit 82 either directly or through a network controller (not shown). The driver input devices 86 are configured to provide information to and/or control the brake control unit 82. For example, the driver input devices 86 can be utilized to activate the front tire burnout/cleaning mode. As illustrated in the example implementation of FIG. 2, driver input devices 86 can include instrument panel cluster 60, user interface 66, an accelerator pedal 88, and a brake pedal 90.

Figure 4:
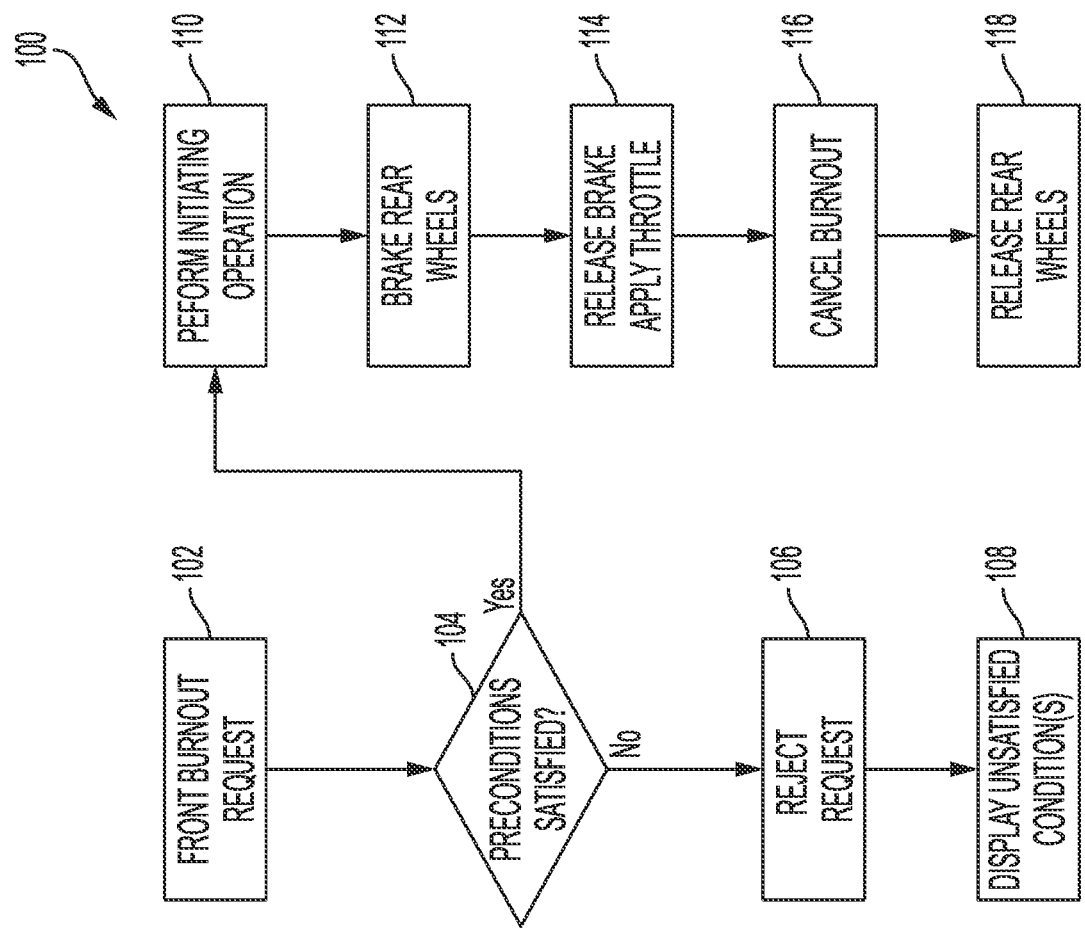
FIG. 4 is a flow control diagram of one example operation of the front tire burnout system, in accordance with the principles of the present disclosure.

FIG. 4 illustrates an example method 100 of performing a controlled front tire burnout and/or controlled front tire cleaning. In one example implementation, the method 100 begins at step 102 where controller 52 receives a signal indicating a driver request for the front tire burnout/cleaning mode. For example, the driver may initiate the request by selecting soft key 68 of the user interface 66 or by providing an audio command to the vehicle 10. At step 104, controller 52 confirms one or more preconditions are satisfied to enter the desired mode. Preconditions may include, but are not limited to: (i) the transfer case 30 being engaged to transfer rotational power to the front wheels 32, 34; (ii) the front differential 38 being locked; (iii) the electric motor(s) 64 active to rotate one or more wheels; (iv) driver on the brake pedal; (v) vehicle speed=0, transfer case 30 is in HI or LO range; and/or (vi) transmission 18 is in a forward or reverse gear.

If one or more of the preconditions are not satisfied, at step 106, controller 52 rejects the front tire burnout/cleaning mode request. At step 108 controller 52 may provide a message to the driver that the front tire burnout request has been rejected. For example, instrument panel display 70 may provide a message indicating that the front tire burnout/cleaning is unavailable and the reason(s) why (i.e., which preconditions were not satisfied).

If all of the preconditions are met, control proceeds to step 110 and directs the driver to perform an operation to activate the braking of the rear wheels 22, 24. For example, controller 52 may display a message on instrument panel display 70 directing the driver to press and hold activation button 56 (e.g., on the instrument panel 54, steering wheel, etc.). If the operation is performed correctly, at step 112, controller 52 subsequently transitions the vehicle to the rear wheel braking condition by temporarily disabling propulsive torque to the rear wheels 22, 24, releasing brake pressure from the front wheels 32, 34, and maintaining brake pressure at the rear wheels 22, 24. In other words, the braking pressure is maintained or locked in the braking system lines and components associated with the rear wheels 22, 24 in an absence of use of the brake pedal 90.

At step 114, controller 52 directs the driver to release the brake pedal 90 and apply throttle by pressing the accelerator pedal 88 (e.g., while the driver continues to hold the activation button 56). At this point, the front wheels 32, 34 begin to rotate while the rear wheels 22, 24 remain stationary, thereby performing the controlled burnout. In addition, centrifugal forces cause by the rotation of the front wheels 32, 34 causes mud and debris to detach from the tires, thereby advantageously cleaning the tires and providing better traction with the ground, off-road obstacles, etc. At step 116, the controlled front tire burnout/cleaning is canceled upon meeting a predetermined stop condition such as, for example, releasing the activation button, the wheels meeting or exceeding a predetermined number of revolutions, one or more of the preconditions no longer being met, the vehicle rotates or slides more than a predetermined angle from a starting position, etc. At step 118, the controller 52 releases the hydraulic pressure at rear wheels 22, 24, restores propulsive torque to the rear wheels 22, 24, and the front tire burnout/cleaning mode is canceled.

Figure 5:
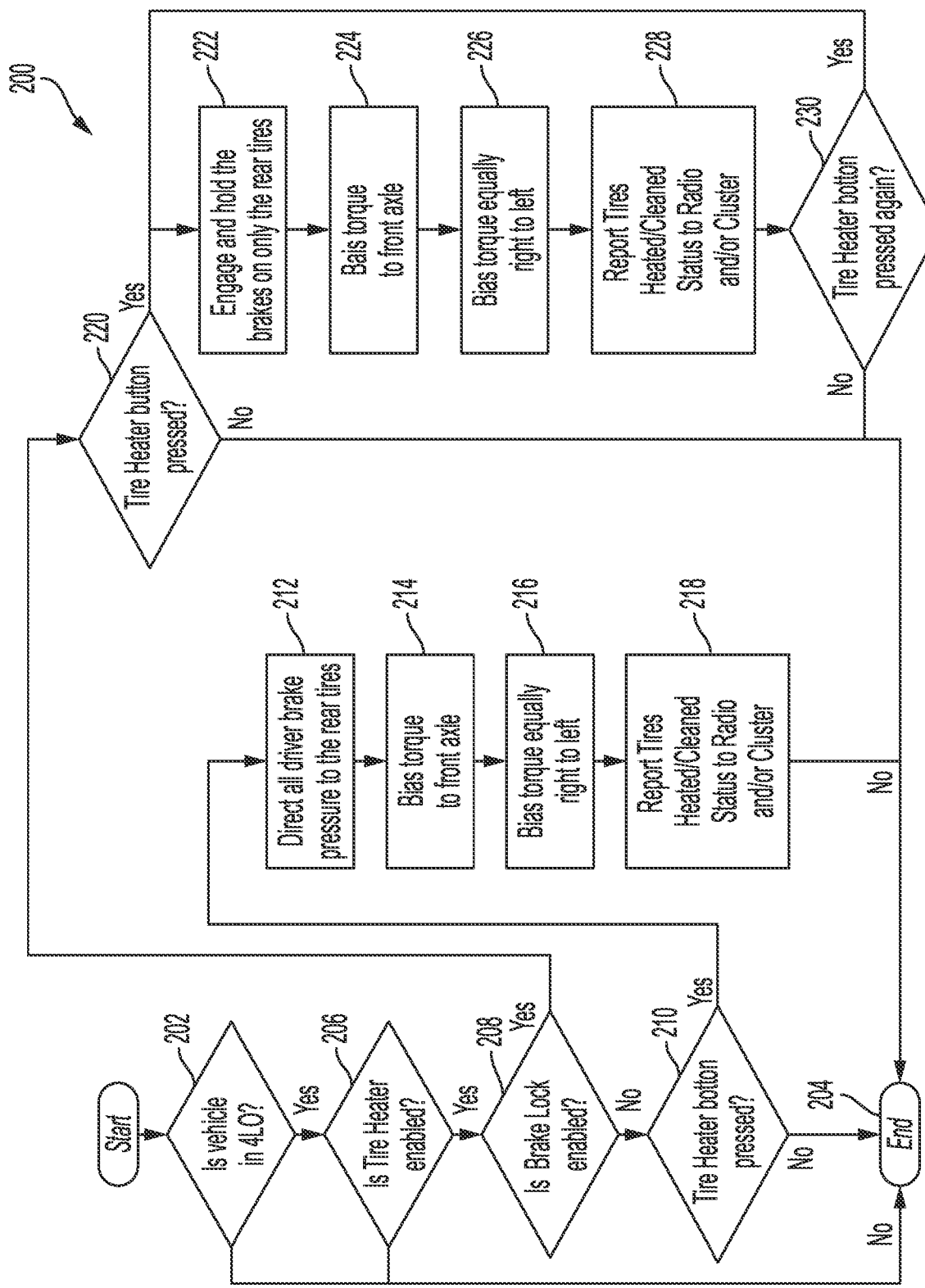
FIG. 5 is a flow control diagram of another example operation of the front tire burnout system, in accordance with the principles of the present disclosure

FIG. 5 illustrates another example method 200 of performing a controlled front tire burnout and/or controlled front tire cleaning when the engine 14 is on, the driver is present, and the vehicle 10 is in gear. In the example implementation, the method 200 begins at step 202 and controller 52 determines if the vehicle 10 is in a predetermined in-gear condition such as, for example, four-wheel-drive LO. If no, control proceeds to step 204 and the operation ends. If yes, control proceeds to step 206 and controller 52 determines if the front tire burnout is enabled via selection of the off-road mode switch 55. If no, control proceeds to step 204. If yes, controller 52 determines if automatic brake lock is enabled via user interface 66 at step 208. If no, control proceeds to step 210 for manual brake lock using a brake pedal 90. If yes, control proceeds to step 220 for automatic front tire burnout, as described herein in more detail.

At step 210, controller 52 determines if front tire burnout mode switch 56 is activated. If no, control proceeds to step 204. If yes, control proceeds to step 212 and controller 52 directs all driver brake pressure to the rear wheels 22, 24. Control then proceeds to step 214 and controller 52 biases torque to front axles 40, for example, based on torque request from an accelerator pedal (not shown). At step 216, controller 52 biases torque equally to the front left wheel 32 and the front right wheel 34. At step 218, controller 52 reports the front tire burnout/cleaning operational status to display 58 and/or instrument panel display 70. Control then proceeds to step 204 and the system ends the front tire burnout/cleaning operation.

At step 220, controller 52 determines if the front tire burnout mode switch 56 is activated. If no, control proceeds to step 204. If yes, control proceeds to step 222 and controller 52 automatically engages and holds the brakes on the rear wheels 22, 24, for example, via braking system 62. Control proceeds to step 224 and controller 52 automatically biases torque to the front axles 40. At step 226, controller 52 biases torque equally to the front left wheel 22 and the front right wheel 24. At step 228, controller 52 reports the front tire burnout/cleaning operational status to display 58 and/or instrument panel display 70. At step 230 controller 52 determines if the front tire heating/cleaning is still requested.

If yes, control returns to step 222. If no, control proceeds to step 204 and the system ends the front tire burnout/cleaning operation.

Described herein are systems and methods for providing a controlled front tire burnout for a vehicle to improve traction in off-road conditions. A driver controller is configured to control a hydraulic brake system. Upon satisfying vehicle preconditions, the controller releases brake pressure from the front wheels and maintains brake pressure on the vehicle rear wheels. The driver may then use the accelerator pedal to rotate the front tires and perform a controlled front tire burnout and/or front tire cleaning. The front tire burnout/cleaning is deactivated either manually (by the driver) or automatically (certain conditions met) and the vehicle returns to normal operating behavior. Advantageously, the front tire burnout increases the temperature of the tire and removes debris therefrom, thus increasing traction for off-road maneuvers.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A front tire heating and cleaning system for a vehicle, the system comprising:
    a brake system configured to selectively apply hydraulic braking pressure against front wheels and rear wheels of the vehicle;
    a controller in signal communication with the brake system, the controller configured to:
        upon receipt of a request, initiate a controlled front tire heating mode where the brake system is controlled to selectively apply hydraulic braking pressure against the rear wheels and not the front wheels, and rotate the front wheels to perform a burnout to increase tire temperature for improved front wheel traction during off-road maneuvers, and
        upon receipt of a second request, the controller is configured to initiate a front tire cleaning mode where the brake system is controlled to selectively apply hydraulic braking pressure against the rear wheels and not the front wheels such that the front wheels are free to rotate to eject debris therefrom,
        wherein the controller rotates the front wheels in a first direction to perform the front tire heating mode, and in an opposite second direction to perform the front tire cleaning mode; and
    a user interface in signal communication with the controller, the controller configured to receive the request from the user interface indicating the driver has selected the front tire heating and/or cleaning mode,
    wherein the controller is configured to determine whether a vehicle precondition is satisfied before enabling the vehicle to enter the front tire heating and/or cleaning mode, the vehicle precondition including:
        (i) a transfer case being engaged to transfer rotational power to the front wheels;
        (ii) a front differential being locked; and
        (iii) the vehicle being in a four-wheel-drive LO gear condition.

2. The front tire heating and cleaning system of claim 1, wherein the controller is configured to temporarily disable propulsive torque to the rear wheels when operating in the front tire heating and/or cleaning mode.

3. The front tire heating and cleaning system of claim 1, further comprising an activation switch disposed within the vehicle, wherein the activation switch is selected to enable the performance of the front tire heating and/or cleaning mode.

4. The front tire heating and cleaning system of claim 1, wherein during the front tire heating and/or cleaning mode, the user interface is configured to display a message indicating the front tire heating and/or cleaning mode is active.

5. A method of performing a controlled front tire heating and cleaning mode of operation on a vehicle having front wheels and rear wheels, the method comprising:
    receiving, at a controller, a request for a front tire heating mode;
    based on the received request, initiating the front tire heating mode with the controller by applying hydraulic braking pressure against the rear wheels and not the front wheels of the vehicle, and rotating the front wheels to increase tire temperature for improved front wheel traction during off-road maneuvers;
    receiving, at the controller, a second request for the front tire cleaning mode; and
    based on the received second request, initiating the front tire cleaning mode where the brake system is controlled to selectively apply hydraulic braking pressure against the rear wheels and not the front wheels such that the front wheels are free to rotate to eject debris therefrom;
    wherein the controller rotates the front wheels in a first direction to perform the front tire heating mode, and in an opposite second direction to perform the front tire cleaning mode; and
    determining whether a vehicle precondition is satisfied before enabling the vehicle to enter the front tire heating and/or cleaning mode, the vehicle precondition including:
        (i) a transfer case being engaged to transfer rotational power to the front wheels;
        (ii) a front differential being locked; and
        (iii) the vehicle being in a four-wheel-drive LO gear condition.

6. The method of claim 5, further comprising temporarily disabling propulsive torque to the rear wheels when operating in the front tire heating and/or cleaning mode.

7. The method of claim 5, further comprising preventing initiation of the front tire heating and/or cleaning mode until an activation switch disposed within the vehicle is selected.

8. The method of claim 5, wherein the request and/or second request is received from a user interface indicating the driver has selected the front tire heating and/or cleaning mode.

9. The method of claim 5, further comprising displaying, on a user interface of the vehicle, a message indicating when the front tire heating and/or cleaning mode is active.

10. The method of claim 5, wherein the first direction is a forward direction, and the second direction is a reverse direction.

11. The front tire heating and cleaning system of claim 1, wherein the first direction is a forward direction, and the second direction is a reverse direction.

* * * * *